US012686997B2

(12) United States Patent
Yu

(10) Patent No.: US 12,686,997 B2
(45) Date of Patent: Jul. 21, 2026

(54) TRANSPARENT DISPLAY-BASED WORK ASSISTANCE METHOD AND DEVICE FOR CONSTRUCTION MACHINERY

(71) Applicant: HD CONSTRUCTION EQUIPMENT CO., LTD, Seongnam-si (KR)

(72) Inventor: Wookhyun Yu, Incheon (KR)

(73) Assignee: HD CONSTRUCTION EQUIPMENT CO., LTD., Seongnam-si (KR)

( * ) Notice: Subject to any disclaimer, the term of this patent is extended or adjusted under 35 U.S.C. 154(b) by 0 days.

(21) Appl. No.: 18/836,506

(22) PCT Filed: Feb. 3, 2023

(86) PCT No.: PCT/KR2023/001574
§ 371 (c)(1),
(2) Date: Aug. 7, 2024

(87) PCT Pub. No.: WO2023/153722
PCT Pub. Date: Aug. 17, 2023

(65) Prior Publication Data
US 2025/0171981 A1 May 29, 2025

(30) Foreign Application Priority Data
Feb. 8, 2022 (KR) ........................ 10-2022-0016018
Feb. 8, 2022 (KR) ........................ 10-2022-0016019

(51) Int. Cl.
*B60K 35/00* (2024.01)
*E02F 9/26* (2006.01)
(Continued)

(52) U.S. Cl.
CPC ............. *E02F 9/261* (2013.01); *H04N 7/183* (2013.01); *B60R 1/23* (2022.01); *B60R 2300/20* (2013.01);
(Continued)

(58) Field of Classification Search
CPC ... E02F 9/261; E02F 9/24; E02F 9/264; E02F 9/20; E02F 9/26; H04N 7/183;
(Continued)

(56) References Cited

U.S. PATENT DOCUMENTS 11,959,253 B2 * 4/2024 Yamamoto ............ E02F 9/2296
2019/0291579 A1 * 9/2019 Fujita ........................ E02F 9/26
(Continued)

FOREIGN PATENT DOCUMENTS

JP H10-299032 A 11/1998
JP 2011-11620 A 1/2011
(Continued)

OTHER PUBLICATIONS

International Search Report issued for corresponding International Patent Application No. PCT/KR2023/001574 on May 26, 2023, along with an English translation (6 pages).
(Continued)

*Primary Examiner* — Howard D Brown, Jr.
(74) *Attorney, Agent, or Firm* — Hauptman Ham, LLP

(57) ABSTRACT

The present invention relates to a transparent display-based work assistance method for construction machinery. The transparent display-based work assistance method for construction machinery comprises the steps of: receiving, from at least one image sensor, images obtained by capturing the surroundings of a construction machine; activating a transparent display panel in the entire or partial area of a windshield of the construction machine; and displaying the captured images or contents associated with work of the construction machine on the activated transparent display panel.

17 Claims, 14 Drawing Sheets

(51) Int. Cl.
*H04N 7/18* (2006.01)
*B60R 1/23* (2022.01)
*G02B 27/01* (2006.01)

(52) U.S. Cl.
CPC ... *B60R 2300/308* (2013.01); *B60R 2300/802* (2013.01); *B60R 2300/8093* (2013.01); *G02B 27/0101* (2013.01)

(58) Field of Classification Search
CPC . B60R 1/23; B60R 2300/20; B60R 2300/308; B60R 2300/802; B60R 2300/8093; G02B 27/0101; G06F 3/14; G06T 19/00
See application file for complete search history.

(56) References Cited

U.S. PATENT DOCUMENTS

| | | | | |
|---|---|---|---|---|
| 2020/0218071 | A1* | 7/2020 | Aoki | B60K 35/28 |
| 2020/0292815 | A1* | 9/2020 | Vetsch | B60K 35/23 |
| 2021/0239976 | A1* | 8/2021 | Pridie | G02B 30/52 |
| 2022/0390743 | A1* | 12/2022 | Daping | G02B 27/0018 |
| 2023/0088007 | A1* | 3/2023 | Hartwig | B60K 35/60<br>359/632 |
| 2023/0185147 | A1* | 6/2023 | Ahn | G02F 1/15165<br>359/273 |
| 2024/0019693 | A1* | 1/2024 | Wang | G02B 27/0101 |

FOREIGN PATENT DOCUMENTS

| | | | |
|---|---|---|---|
| JP | 2021-1472 | A | 1/2021 |
| KR | 10-2014-0084409 | A | 7/2014 |
| KR | 10-2021-0140737 | A | 11/2021 |

OTHER PUBLICATIONS

Written Opinion issued for corresponding International Patent Application No. PCT/KR2023/001574 on May 26, 2023 (5 pages).

* cited by examiner (a)

(b)

(a)

(b)

1300

START

RECEIVE IMAGE OBTAINED BY CAPTURING SURROUNDING
OF CONSTRUCTION MACHINERY FROM AT LEAST
ONE IMAGE SENSOR — S1310

ACTIVATE TRANSPARENT DISPLAY PANEL IN PARTIAL
AREA OR ENTIRE AREA OF GLASS OF
CONSTRUCTION MACHINERY — S1320

DISPLAY CAPTURED IMAGE OR CONTENT ASSOCIATED
WITH WORK OF CONSTRUCTION MACHINERY
ON ACTIVATED TRANSPARENT DISPLAY PANEL — S1330

END

TRANSPARENT DISPLAY-BASED WORK ASSISTANCE METHOD AND DEVICE FOR CONSTRUCTION MACHINERY

CROSS REFERENCE TO RELATED APPLICATION

The present application is a National Stage filing under 35 U.S.C. § 371 of PCT application number PCT/KR2023/001574, filed on Feb. 3, 2023, which is based upon and claims the benefit of priority to Korean Patent Application Nos. 10-2022-0016018 and 10-2022-0016019, filed on Feb. 8, 2022, in the Korean Intellectual Property Office. All of the aforementioned applications are incorporated herein by reference in their entireties.

TECHNICAL FIELD

The present invention relates to a method and a device of transparent display-based work assistance for construction machinery, and particularly, to a method and a device of transparent display-based work assistance for construction machinery, which display various information for assisting work of a worker by replacing a glass (window) of the construction machinery with a transparent display panel.

BACKGROUND ART

In general, a variety of construction machinery such as excavators, bulldozers, loaders, forklift trucks, scrapers, dump trucks, cranes, and the like for performing civil engineering projects, building operations, etc., at construction sites are used. Unlike general vehicles, the construction machinery includes components for work, for example, components such as a boom and a boom cylinder. Due to these structural characteristics, the visibility of the worker may be blocked depending on an operation of a construction machinery working machine, causing various safety accidents or making it difficult to perform precise work.

DISCLOSURE

Technical Problem

In order to solve the problem, the present invention provides a transparent display-based work assistance method for construction machinery, a computer program stored in a computer-readable medium, a computer-readable medium storing the computer program, and a device (system).

Technical Solution

The present invention may be implemented by various schemes including a method, a device (system), a computer program stored in a computer-readable medium, and a computer-readable medium storing the computer program.

According to an embodiment of the present invention, a transparent display-based work assistance method for construction machinery performed by at least one processor includes: receiving an image obtained by capturing a surrounding of the construction machinery from at least one image sensor; activating a transparent display panel in a partial area or the entire area of a glass of the construction machinery; and displaying the captured image or a content associated with work of the construction machinery on the activated transparent display panel.

According to an embodiment of the present invention, the receiving of the captured image includes receiving an image captured through at least one image sensor installed at one side of a boom of the construction machinery. The displaying of the captured image or the content associated with work of the construction machinery on the activated transparent display panel includes displaying the received image in the partial area or the entire area of the transparent display panel based on a motion of the boom.

According to an embodiment of the present invention, the transparent display-based work assistance method for construction machinery further includes acquiring user information including information on a visibility of a worker of the construction machinery; and converting an image corrected to correspond to the visibility of the worker according to the user information into a virtual image for displaying on the transparent display panel.

According to an embodiment of the present invention, the transparent display-based work assistance method for construction machinery further includes detecting an object included in the image by using a predetermined moving object detection (MOD) algorithm; and displaying information on the detected object on the transparent display panel jointly with the image.

According to an embodiment of the present invention, the transparent display-based work assistance method for construction machinery further includes calculating a distance between the detected object and the construction machinery; and displaying information related to the calculated distance on the transparent display panel jointly with the image.

According to an embodiment of the present invention, the transparent display-based work assistance method for construction machinery further includes displaying a warning icon on the transparent display panel jointly with the image when the detected object exists within a predetermined distance from the construction machinery.

According to an embodiment of the present invention, the transparent display-based work assistance method for construction machinery further includes, when displaying the acquired image on the transparent display panel, displaying an image representing the shape of the boom of the construction machinery jointly with the image.

According to an embodiment of the present invention, the transparent display-based work assistance method for construction machinery further includes determining an area where the visibility of the worker of the construction machinery is blocked by a motion of the construction machinery in an area of the transparent display panel. The displaying of the received image in the partial area or the entire area of the transparent display panel based on the motion of the boom includes displaying the received image on the determined area of the transparent display panel.

According to an embodiment of the present invention, the transparent display-based work assistance method for construction machinery further includes judging whether there is an obstacle blocking the visibility of the worker of the construction machinery. The activating of the transparent display panel in the partial area or the entire area of the glass of the construction machinery includes activating the transparent display panel according to whether there is the obstacle.

Construction machinery including a cabin where a worker is located according to an embodiment of the present invention includes: a glass placed on at least one side of the cabin; a transparent display panel replacing at least a partial area of the glass; an image sensor capturing a surrounding image of the construction machinery; and a control unit activating the transparent display panel based on work information or a worker signal of the construction machinery. The transparent display panel displays the captured image or a content associated with work of the construction machinery. According to an embodiment of the present invention, the control unit detects an object included in the image by using a predetermined MOD algorithm, and displays information on the detected object on the transparent display panel jointly with the image.

According to an embodiment of the present invention, the control unit detects an object included in the image by using a predetermined MOD algorithm, and displays a warning icon on the transparent display panel when the detected object exists within a predetermined distance from the excavator.

According to an embodiment of the present invention, the control unit detects an object included in the image by using a predetermined MOD algorithm, and displays the information on the detected object on the transparent display panel without outputting the image.

According to an embodiment of the present invention, the transparent display panel is placed on a side of the cabin, the construction machinery includes an excavator, and a work machine of the excavator is placed on a front part of the transparent display panel.

According to an embodiment of the present invention, the control unit activates or deactivates the transparent display panel based on a motion of swinging left or right by the work machine of the excavator.

According to an embodiment of the present invention, the transparent display panel includes a partial or entire activation area.

According to an embodiment of the present invention, the transparent display panel includes an auxiliary image changed based on the image output to the transparent display panel, and an icon image or text image changed regardless of the image output to the transparent display panel.

According to an embodiment of the present invention, the image sensor is placed away from the construction machinery.

Advantageous Effects

In various embodiments of the present invention, by displaying or outputting an image beyond a boom of an excavator on a transparent display panel, a problem of the visibility of the worker being blocked due to a structural problem of the excavator can be solved and the resulting occurrence of safety accidents can be effectively prevented.

In various embodiments of the present invention, a computing device can implement an optimized image such as a worker actually gazing at an environment beyond a boom of an excavator through image correction, and provide various information on the environment beyond the boom to the worker jointly through image conversion.

In various embodiments of the present invention, an excavator worker can naturally check or recognize the movement of the boom as well as an image beyond a boom cylinder through a transparent display panel.

In various embodiments of the present invention, the excavator worker can not only check the image beyond the boom, but also simply check various information about the environment beyond the boom to prevent safety accidents.

In various embodiments of the present invention, by displaying or outputting an image on an image display area determined based on user information, the worker can check an image optimized according to his or her actual visibility.

Effects of the present invention are not limited to the aforementioned effects and other unmentioned effects will be clearly understood by those skilled in the art (referred to as "those skilled in the art") from the claims.

The embodiments of the present invention will be described by reference to the accompanying drawings described below, where the similar reference numerals represent similar elements, but are not limited thereto.

MODE FOR INVENTION

Figure 1:
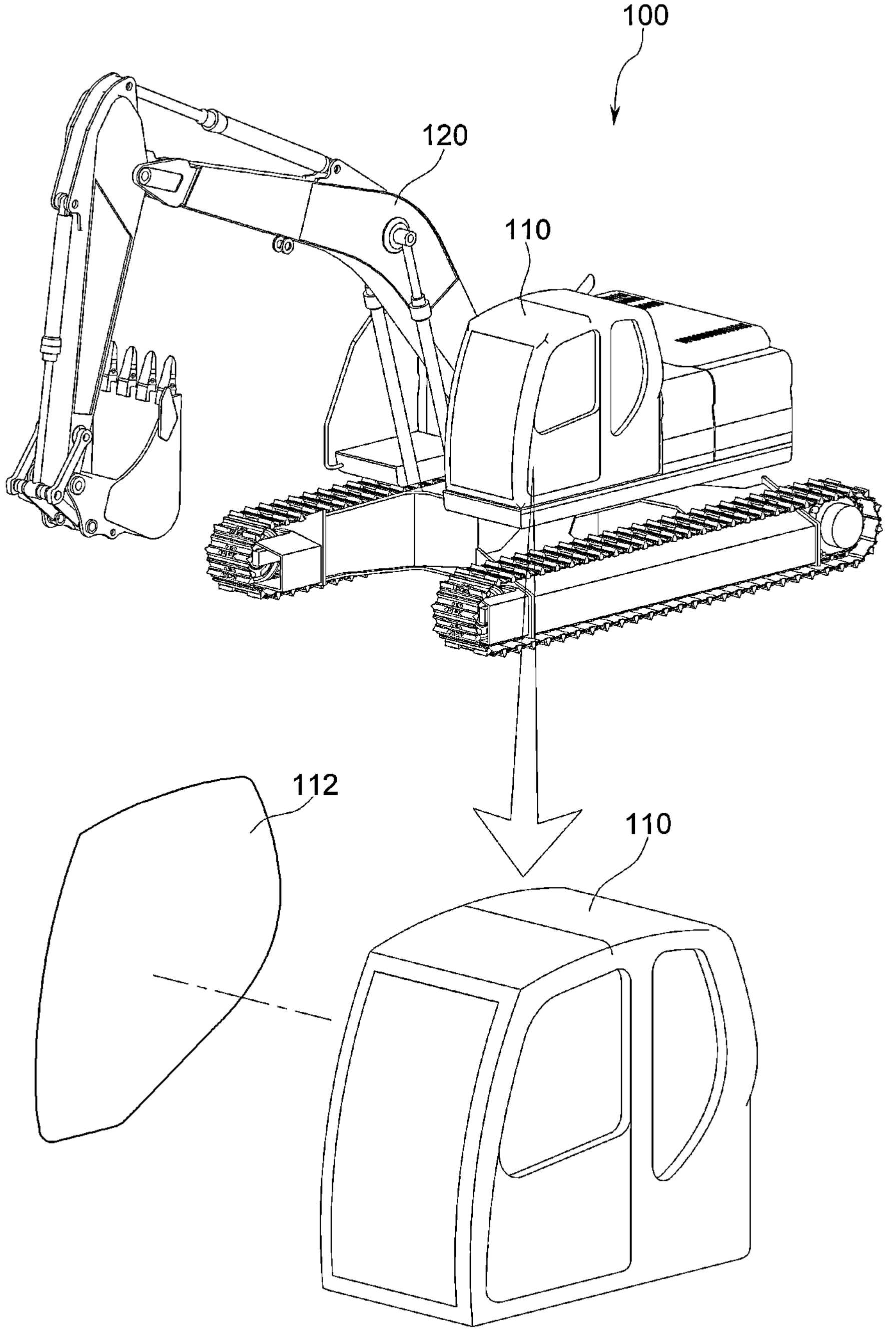
FIG. 1 is an exemplary diagram illustrating a structure of an excavator according to an embodiment of the present invention.

Hereinafter, specific contents for carrying out the present invention will be described in detail with reference to the accompanying drawings. However, in the following description, if the gist of the present invention may be unnecessarily obscure, the specific description of the well-known functions or configurations will be omitted.

In the accompanying drawings, the same or corresponding component is represented by the same reference numeral. Further, in describing the following embodiments, redundantly describing the same or corresponding component may be omitted. However, even though the description of the component is omitted, it is not intended that such a component is not included in any embodiment.

Advantages and features of the disclosed embodiment of the present invention, and methods for accomplishing the same will be more clearly understood from embodiments described below with reference to the accompanying drawings. However, the present invention is not limited to an embodiment disclosed below but may be implemented in various different shapes and the embodiments just complete the present invention and is provided to completely inform a scope of the present invention to those skilled in the art.

Terms used in this specification will be described in brief and the disclosed embodiment will be described in detail. Terms used in this specification adopt general terms which are currently widely used as possible by considering functions in the present invention, but the terms may be changed depending on an intention of those skilled in the art, a precedent, emergence of new technology, etc. Further, in a specific case, a term which an applicant arbitrarily selects is present and in this case, a meaning of the term will be disclosed in detail in a corresponding description part of the invention. Accordingly, the term used in the present invention should be defined based on not just a name of the term but a meaning of the term and contents throughout the present invention.

A singular expression in this specification includes a plural expression if there is no clearly singular meaning in the context. Further, the plural expression includes the singular expression if there is no clearly plural meaning in the context. Throughout the specification, unless explicitly described to the contrary, any part including any component may mean that any part may further include another component other than the exclusion of any other component.

In the present invention, the terms "include", "including", etc., may indicate that features, steps, operations, elements, and/or components are present, but the terms do not exclude addition of one or more other functions, steps, operations, elements, components, and/or a combination thereof.

In the present invention, if a specific component is mentioned as "coupled", "combined", "connected", or "reacted" in any other component, the specific component is directly coupled, combined, and/or connected, or reacted to other components, but not limited thereto. For example, one or more intermediate components may be present between the specific component and another component. Further, in the present invention, "and/or" may include one or more respective items listed or at least some combinations of one or more items.

In the present invention, the terms "first," "second," and the like are used to differentiate a specific component from other components, but the component is not limited to the term. For example, the "first" component may be the same or similar element as the "second" component.

In the present invention, "construction equipment" as a machine used for civil engineering projects, building operations, etc., may include excavators, bulldozers, loaders, forklift trucks, scrapers, dump trucks, cranes, and the like, but is not limited thereto.

In the present invention, "transparent display panel" may refer to a transparent display panel that spontaneously emits light and color without a back light unit, and include organic light emitting diodes (OLED), Quantum dot Light Emitting Diodes (QLED), etc.

In the present invention, "parameters associated with an image" may include parameters associated with size, angle, color, saturation, brightness, region of interest determination, etc., of the image, but are not limited thereto, and may further include any parameters associated with image processing.

In the present invention, "Moving Object Detection (MOD) algorithm" may refer to an algorithm for detecting moving objects in a predetermined area around an excavator. Additionally, the MOD algorithm may include an algorithm for providing a warning lamp to a user when an object is detected.

In the present invention, "drawing information" may include text data, image data, video data, etc. for drawings used in civil engineering, architecture, and construction sites. Additionally, drawing information may include information generated by preprocessing text, images, videos, etc., of an input drawing.

In the present invention, "activation" may refer to a control method and/or technology that brings a transparent display panel into a state in which contents can be displayed.

FIG. 1 is an exemplary diagram illustrating a structure of an excavator 100 according to an embodiment of the present invention. According to an embodiment, the construction machinery may include an excavator 100. Here, the excavator 100 may refer to a construction machine used to excavate soil, rocks, etc. As illustrated, the excavator 100 may include structures such as a cabin 110 in which a worker (driver) controls the excavator 100, an arm that moves a bucket back and forth, a boom 120 that moves the arm to move the bucket up and down, an arm cylinder that controls the movement of the arm and the boom, and a boom cylinder, but is not limited thereto.

In general, a work machine such as the boom 120 and the boom cylinder of the excavator 100 may be located on a right side of the cabin 110. In other words, the worker of the excavator 100 may have his right visibility partially blocked by the work machines such as the boom 120 and the boom cylinder located on the right side. In other words, a visibility of the worker in the cabin 110 through a right window 112 of the cabin 110 may not be sufficiently secured.

In order to secure the right visibility of the worker, which is blocked by work machines such as the boom 120 and the boom cylinder, at least a partial area of the one side window (e.g., right window) 112 of the cabin 110 may be replaced with a transparent display panel. That is, the work machine of the excavator 100 may be placed on a front part of the transparent display panel. In this case, an image captured beyond the work machines such as the boom 120 and the boom cylinder may be displayed or output on the replaced transparent display panel. In other words, the captured image may be acquired through at least one image sensor installed on one side (e.g., right side) of the boom 120 of the excavator, and the acquired image may be displayed on the transparent display panel.

Additionally or alternatively, a content associated with work of the construction equipment may be displayed on the transparent display panel. Here, the content may include any text, image, video, etc., on the transparent display panel, and for example, the content may include an icon image indicating the amount of fuel of the excavator 100, etc., and text images indicating a speed of the excavator, an RPM of the excavator, etc.

By such a configuration, by displaying or outputting the image beyond the boom of the excavator 100 on the transparent display panel, a problem of the visibility of the worker being blocked due to a structural problem of the excavator 100 can be solved and the resulting occurrence of safety accidents can be effectively prevented.

Figure 2:
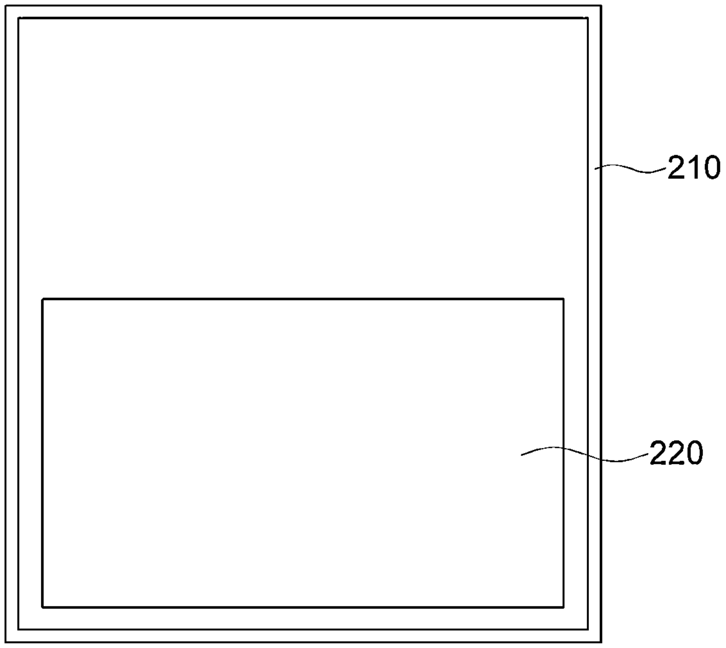
FIG. 2 is a diagram illustrating an example of a glass of construction machinery according to an embodiment of the present invention.

FIG. 2 is a diagram illustrating an example of a glass 210 of construction machinery according to an embodiment of the present invention. According to an embodiment, at least a partial area of the glass 210 may be replaced with a transparent display panel 220. In this case, a computing device (and/or control unit) may activate or deactivate the transparent display panel 220 according to various conditions. For example, when the transparent display panel 220 is activated, any information to assist work may be displayed on the panel.

According to an embodiment, the computing device may activate the transparent display panel based on work information of the construction equipment or a signal of the worker. For example, the computing device may activate the transparent display panel when receiving work information, such as images obtained by capturing surroundings of the construction equipment (e.g., images containing a work space) and/or drawing information associated with the work of the construction equipment. In another example, the computing device may activate the transparent display panel based on receiving a worker signal, such as pressing a button to activate the transparent display panel.

Additionally or alternatively, the computing device may judge whether there is an obstacle blocking the visibility of the worker of the construction equipment, and activate the transparent display panel according to whether there is the obstacle. That is, the computing device may acquire an image and/or a video of a gaze direction of the worker based on any image sensor installed therein, and determine whether there is the obstacle blocking the visibility of the worker based thereon. For example, when the visibility is blocked due to the presence of foreign substances such as dust or snow on the glass located in the gaze direction of the worker, the computing device may display an image beyond the obstacle by activating the transparent display panel.

Additionally or alternatively, the computing device may activate or deactivate the transparent display panel based on a motion of the work machine of the construction equipment (e.g., excavator) swinging left or right. Here, the work machine may refer to parts such as the boom, the boom cylinder, the bucket, etc., that constitute construction equipment. For example, when the work machine of the construction equipment swings left or right and moves into a position determined to block the visibility of the worker, the computing device may activate an associated transparent display panel to ensure the visibility of the worker.

As described above, when the transparent display panel 220 included in a lower end of the glass 210 is activated, the image obtained by capturing the surroundings of the construction equipment or a content (e.g., AR content and/or MR content) associated with the work of the construction equipment may be displayed or output on the transparent display panel 220. Here, the transparent display panel may include an auxiliary image changed based on the image output to the transparent display panel, and an icon image or a text image changed regardless of the image output to the transparent display panel.

In FIG. 2, a specific area on the lower end of the glass 210 is illustrated to be replaced with the transparent display panel 220, but the present invention is not limited thereto. For example, the transparent display panel 220 may be included in another specific area of the glass 210, or configured to replace the entirety of the glass 210.

Figure 3:
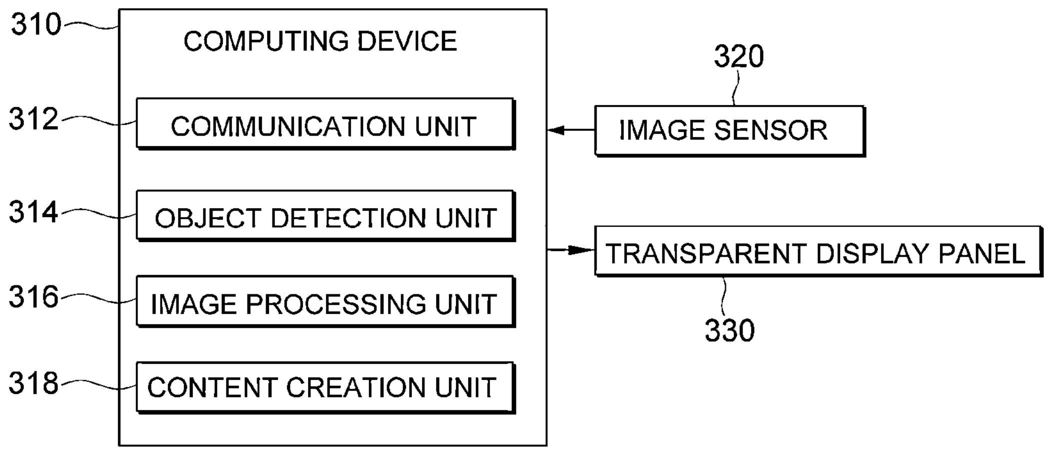
FIG. 3 is a functional block diagram illustrating an internal configuration of a computing device according to an embodiment of the present invention.

FIG. 3 is a functional block diagram illustrating an internal configuration of a computing device 310 according to an embodiment of the present invention. As illustrated, the computing device 310 may include a communication unit 312, an object detection unit 314, an image processing unit 316, a content creation unit 318, etc., but is not limited thereto. The computing device 310 may communicate with the image sensor 320 and/or the transparent display panel 330 and exchange data and/or information required for image processing and/or securing the visibility of the worker of the construction equipment. Here, the computing device 310 may refer to any device for processing the image received from the image sensor 320 and displaying or outputting the image on the transparent display panel 330. Further, the image sensor is a device for capturing images and/or videos and may be installed on the construction equipment or placed away from the construction equipment in a work space. According to an embodiment, the communication unit 312 may acquire the image obtained by capturing the surroundings of the construction equipment from the image sensor 320. For example, the image sensor 320 may include a stereoscopic camera, a depth camera, etc., composed of a plurality of sensors. That is, the image and/or video captured by the image sensor 320 may include depth information, and the communication unit 312 may receive an image, a video, etc., including the depth information from the image sensor 320.

Additionally or alternatively, a capturing direction and a capturing area of the image sensor 320 are not fixed and may be adaptively changed depending on a gaze direction and/or a gaze area of the worker. For example, one or more different image sensors may exist inside the cabin of the construction equipment to capture the worker. In this case, the gaze direction and/or the gaze area of the worker may be determined based on videos of the worker captured by one or more different image sensors. Information on the gaze direction and/or gaze area determined as such may be calibrated in a form for adjusting parameters of the image sensor 320, and the capturing direction and/or the capturing area of the image sensor 320 may be in real time changed or adjusted through the calibrated information.

According to an embodiment, the object detection unit 314 may detect an arbitrary object included in the image acquired from the image sensor 320, and generate information about the detected object (e.g., information on a class of the object, a location and/or area of the object, etc.). In other words, the information on the object may include a bounding box coordinate indicating the location and/or area of the object, class information indicating the class of the object, etc. Here, the object as an object distinguished as a predetermined class may include people and/or other construction equipment such as a tractor, a wheel loader, etc. The object detection unit 314 may detect an object included in the image using a predetermined Moving Object Detection (MOD) algorithm, but is not limited thereto. For example, the object detection unit 314 may detect the object included in the image using any object detection algorithm and/or a machine learning model.

Additionally or alternatively, the object detection unit 314 may calculate a distance between the detected object and the construction equipment based on the depth information included in the image. In this case, any algorithm and/or machine learning model for calculating the distance from the object included in the image may be used. Information on the distance calculated as such may be associated with the information on the detected object, and when it is judged that the calculated distance is within a predetermined distance, a visual and/or auditory warning signal may be provided to the worker.

According to an embodiment, the image processing unit 316 may correct the image acquired from the image sensor 320 to correspond to the visibility of the worker of the construction equipment. For example, the image captured by the image sensor 320 and an environment at which the worker actually gazes may be different due to a distance between the worker in the cabin and the image sensor 320, a difference between a gaze height of the worker and a height at which the image sensor 320 is installed, a difference in field of view between the worker and the image sensor, etc. The image processing unit 316 may perform image correction in order to correct the difference between the worker and a camera.

According to an embodiment, the image processing unit 316 may acquire user information including information for the visibility of the worker of the construction equipment, and correct at least some of the values of parameters associated with the acquired image based on the acquired user information to correspond to the visibility of the worker of the excavator. For example, the user information may include, but is not limited to, information on a sitting height entered by the worker, and may include information on a gaze height, a head position, etc., of the worker generated based on the images and/or videos captured by one or more different image sensors installed in the cabin. That is, the image processing unit 316 may generate an image similar to the worker's actual visibility by correcting at least some of the values of parameters associated with a size and an angle of the image to correspond to the gaze height, the head position, etc., of the worker.

Additionally, the image processing unit 316 may convert an image corrected to correspond to the visibility into a virtual image for displaying on the transparent display panel 330. Here, the virtual image may include, but is not limited thereto, an Augmented Reality (AR)-based image and/or a Mixed Reality (MR)-based image. For example, a virtual image may be an image generated by fusing real and virtual content. That is, the image processing unit 316 may perform image conversion by combining various virtual information with the corrected image.

The image converted by the image processing unit 316 as such may be transmitted to the transparent display panel 330 and displayed or output. According to an embodiment, the image may be continuously displayed or output on the transparent display panel 330 while the worker operates the construction equipment, but is not limited thereto. For example, when the boom of the construction equipment swings left or right, the image may be displayed or output on the transparent display panel 330. In another example, the image may be displayed or output on the transparent display panel 330 when the worker transmits the worker signal by selecting a specific button associated with the transparent display panel 330 through touching.

According to an embodiment, the content creation unit 318 may create an AR content, an MR content, etc., using operation information of the construction equipment obtained from any control device associated with the construction equipment. For example, the content creation unit 318 acquires information on a driving speed, an RPM, a pump pressure value, a work mode, a fuel amount, fuel efficiency, etc., of the construction machine, and corrects or converts the acquired information into a form for displaying on the transparent display panel 330 to create the AR content.

Additionally or alternatively, the content creation unit 318 may create the AR content, the MR content, etc., using the image received from the image sensor 320, the information on the object detected by the object detection unit 314, etc. For example, the content creation unit 318 displays the object detected based on an actual location and an actual depth of the object for the worker of the construction equipment to identify a detected specific object with a specific color, a bounding box, etc., to create a content, etc.

Additionally or alternatively, the content creation unit 318 acquires drawing information required for the work from the worker of the construction equipment, etc., and matches a virtual work drawing with a location of an actual work space to create the AR content, the MR content, etc. For example, when performing work of digging the ground using a bucket of the excavator, a guide line associated with the work drawing is matched to the actual location of the ground for digging to create the content, etc.

According to an embodiment, the content creation unit 318 may acquire user information including information for the visibility of the worker of the construction equipment, and correct at least some of the values of parameters associated with the content based on the acquired user information to correspond to the visibility of the worker of the construction equipment. For example, the user information may include, but is not limited to, information on a sitting height entered by the worker, and may include information on a gaze height, a head position, etc., of the worker generated based on the images and/or videos captured by one or more different image sensors installed in the cabin of the construction equipment. In this case, the content creation unit 318 uses images (e.g., one or more images) containing the worker to extract information on a sitting height, a gaze height, a head position, etc., of the worker based on any algorithm, or perform user eye tracking, etc. That is, the content creation unit 318 may correct at least some of the values of parameters associated with a size and an angle of the content to correspond to the gaze height, the head position, etc., of the worker.

According to an embodiment, the content creation unit 318 may determine a position and/or an area on the transparent display panel at which the AR content and/or the MR content are/is to be displayed by using the extracted user information such as the sitting height, the gaze height, and the head position of the worker and/or eye tracking information. That is, the content creation unit 318 may create a content adaptively combined with a real environment by comprehensively analyzing the head position, gaze height, etc., of the worker. The generated content may be provided, or output or displayed onto the transparent display panel 330.

In FIG. 3, respective functional components included in the computing device 310 are separately described, but this is just to assist understanding the present invention, and two or more functions may also be performed by one computation device. By such a configuration, the computing device 310 may implement an optimized image such as a worker actually gazing at an environment beyond a boom of an excavator through image correction, and provide various information on the environment beyond the boom to the worker jointly through image conversion.

Figure 4:
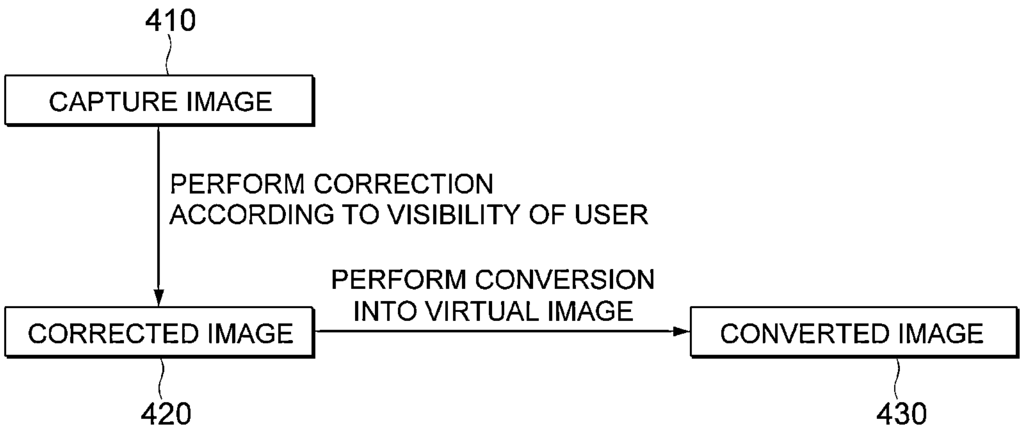
FIG. 4 is an exemplary block diagram illustrating a process of performing image correction and conversion according to an embodiment of the present invention.

FIG. 4 is an exemplary block diagram illustrating a process of performing image correction and conversion according to an embodiment of the present invention.

As described above, the computing device (310 in FIG. 3) may acquire a captured image 410 through at least one image sensor associated with the construction equipment. Here, the image sensor may include a stereoscopic camera, a depth camera, etc., installed on one side of the boom of the construction equipment or installed around a work environment where the construction equipment operates.

According to an embodiment, the computing device may acquire user information including information on the visibility of the worker of the construction equipment, and correct at least some of the values of parameters associated with the captured image 410 based on the acquired user information to correspond to the visibility of the worker of the excavator to generate a corrected image 420. For example, the corrected image 420 may be generated by correcting the image size and/or angle based on a gaze height, a head position, etc., of a user.

According to an embodiment, the computing device converts the corrected image 420 into a virtual image for displaying on the transparent display panel to generate a converted image 430. That is, the computing device may convert the corrected image 420 into a form suitable for displaying or outputting on the transparent display panel, and generate the converted image 430 by adding the AR and/or MR based content.

Figure 5:
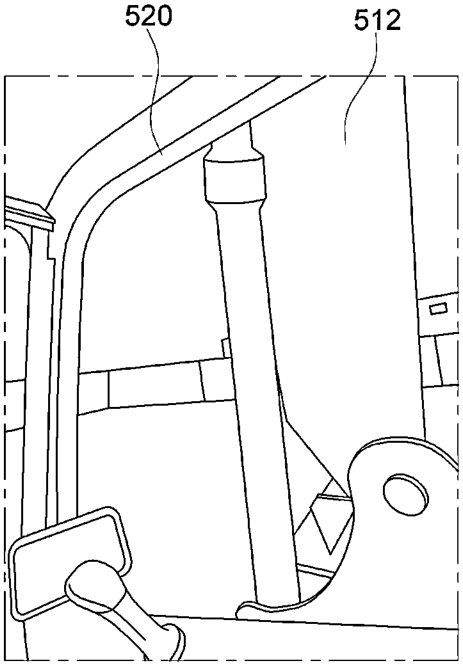
FIG. 5 is a diagram illustrating an example of a one-side window in a cabin according to an embodiment of the present invention.
Figure 5:
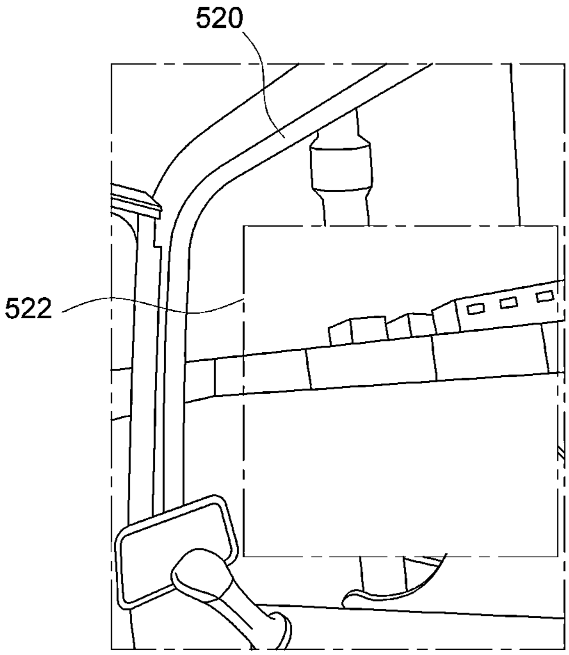

FIG. 5 is a diagram illustrating an example of one-side window 510 or 520 in a cabin according to an embodiment of the present invention. According to an embodiment, the visibility of a one-side window (glass) 510 of the cabin may be blocked by a boom 512 and a boom cylinder of the construction equipment (e.g., excavator). Here, when the boom 512 moves, an area where the visibility is blocked may vary, and when the visibility is blocked in this way, various safety accidents may occur when the excavator is operating.

As illustrated, at least a partial area of the one-side window 520 of the cabin may be replaced with a transparent display panel 522. On this transparent display panel 522, an image beyond the boom may be displayed or output so that worker in the cabin may feel as if the boom 512 does not exist. As described above, the image acquired by the image sensor may be corrected to correspond to the visibility of the worker, and accordingly, the real environment and the image displayed on the transparent display panel 522 are the same as those matched according to the visibility of the worker.

In FIG. 5, the image beyond the boom is displayed on the transparent display panel 522 so that the boom is removed from the visibility of the worker illustrated, but the present invention is not limited thereto. For example, depending on the worker's selection, only information about an object beyond the boom may be displayed on the transparent display panel 522 while the boom remains in the visibility of the worker.

Figure 6:
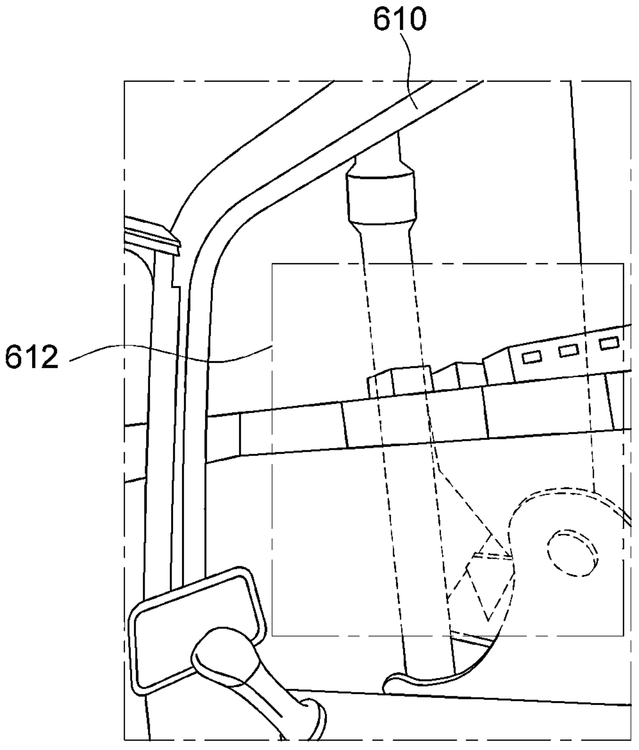
FIG. 6 is a diagram illustrating an example in which an image associated with shapes of a boom and/or a boom cylinder is displayed on a transparent display panel according to an embodiment of the present invention.

FIG. 6 is a diagram illustrating an example in which an image associated with shapes of a boom and/or a boom cylinder is displayed on a transparent display panel 612 according to an embodiment of the present invention. As illustrated, at least a partial area of a one-side window 610 of the cabin may be replaced with a transparent display panel 612. In this case, an image representing the shape of the boom (and/or boom cylinder) of the construction equipment (e.g., excavator) may be displayed on the transparent display panel 612. In other words, when the computing device (310 in FIG. 3) displays the acquired image on the transparent display panel 612, the computing device may display an image representing the shape of the boom of the construction equipment along with the image.

According to an embodiment, the shape of the boom of the construction equipment may be determined depending on the position of the image sensor installed on the boom of the construction equipment. For example, when the boom moves up and down, the position of the image sensor installed on the boom may move or rotate, and the shape of the boom may be determined based on the position of the moved or rotated image sensor. An image corresponding to the determined boom shape may then be generated. Additionally or alternatively, the shape of the boom may be determined by a separate image sensor that captures the movement of the boom.

In the illustrated example, the image representing the shape of the boom may be an image representing outlines of the boom and the boom cylinder with dotted lines, but is not limited thereto. For example, the image may be an image in which the area corresponding to the boom and boom cylinder is colored with a transparent color. By such a configuration, a worker of the construction equipment such as the excavator may naturally check or recognize the movement of the boom as well as the image beyond the boom cylinder through the transparent display panel 612.

Figure 7:
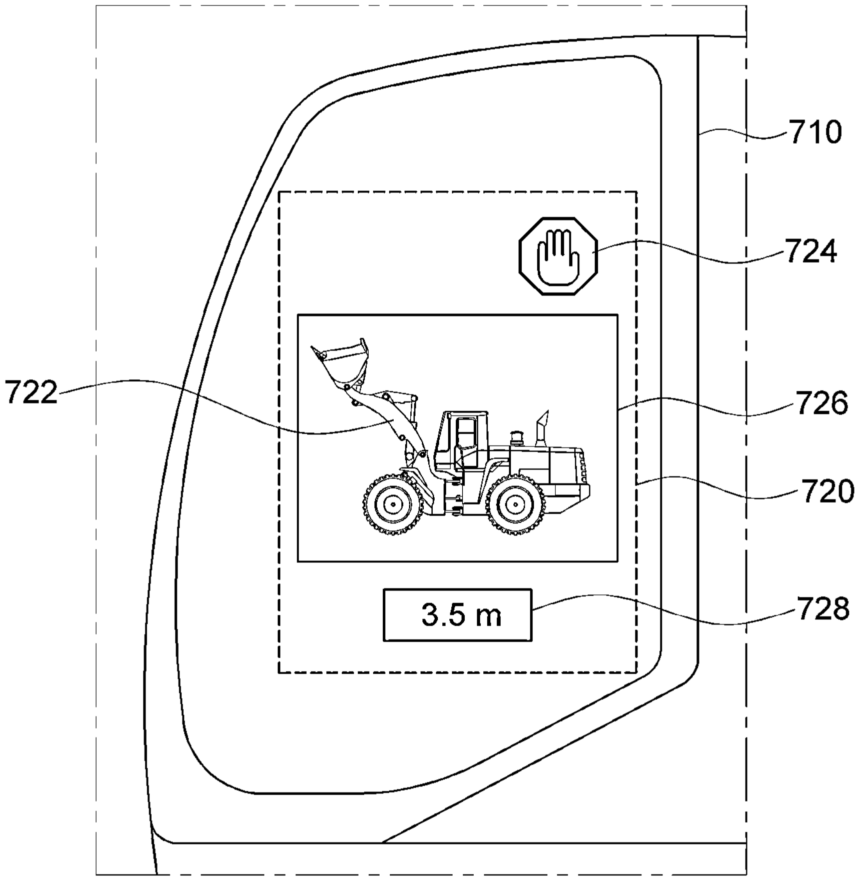
FIG. 7 is a diagram illustrating an example in which information on an object is displayed on the transparent display panel according to an embodiment of the present invention.

FIG. 7 is a diagram illustrating an example in which information on an object 722 is displayed on the transparent display panel 720 according to an embodiment of the present invention. As illustrated, at least a partial area of a one-side window 710 of the cabin may be replaced with a transparent display panel 720. In other words, the one-side window 710 of the cabin may be configured to include an area corresponding to the transparent display panel 720, but is not limited thereto, and the entire one-side window 710 of the cabin may be composed of the transparent display panel.

According to an embodiment, the computing device (310 in FIG. 3) may detect the object 722 included in the image using a predetermined MOD algorithm. Further, information about the detected object 722 may be displayed on the transparent display panel 720. Here, the information about the object 722 may include class information, a position, and an area of the object 722, and include, for example, a bounding box 726 indicating a coordinate of the object 722.

According to an embodiment, the computing device may display the information about the detected object 722 on the transparent display panel 720 jointly with the image. Alternatively, the computing device may display only the information about the detected object 722 on the transparent display panel 720 apart from the image. That is, the computing device may display the information about the object 722 together with the image or separately from the image according to the worker's selection in order to resolve the worker's sense of heterogeneity that occurs when the image is displayed.

Additionally or alternatively, the computing device may calculate the distance between the detected object 722 and the construction equipment based on the depth information included in the image, and display information 728 about the calculated distance on the transparent display panel 720. Further, when the detected object exists within a predetermined distance from the excavator by using the calculated distance, the computing device may display an warning icon 724 on the transparent display panel 720 jointly with the image. In this case, a warning sound may be output through any output device, etc., jointly with the warning icon 724.

In FIG. 7, it is illustrated that the information 728 about the distance is displayed on the lower end of the object 722, and the warning icon 724 is displayed on the top of the object 722, but the present invention is not limited thereto, and positions at which the information 728 about the distance, the warning icon 724, etc., are displayed may be determined differently. By such a configuration, the excavator worker may not only check the image beyond the boom, but also simply check various information about the environment beyond the boom to prevent safety accidents.

Figure 8:
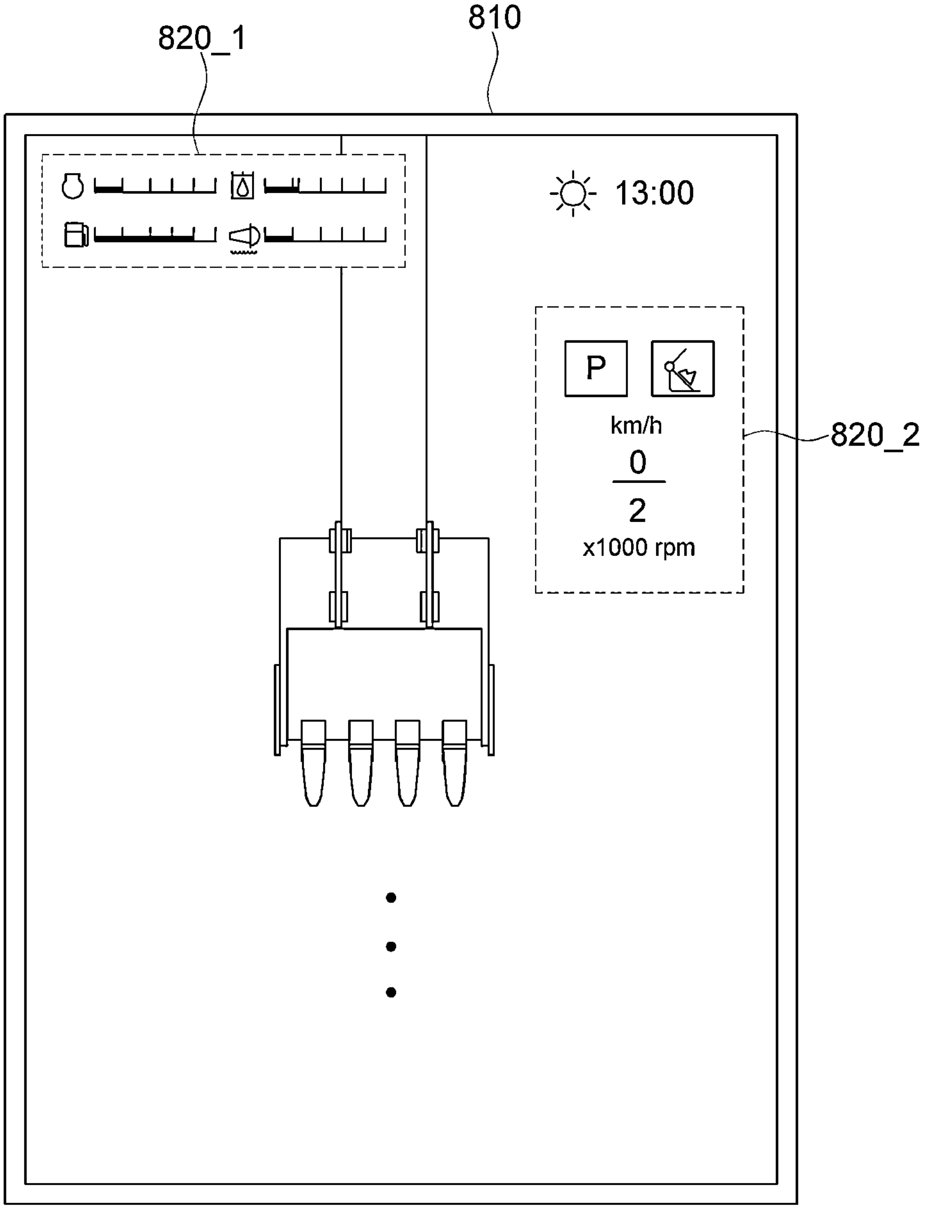
FIG. 8 is a diagram illustrating an example of a glass of construction machinery in which contents associated with the work of the construction machinery are displayed according to an embodiment of the present invention.

FIG. 8 is a diagram illustrating an example of a glass 810 of construction machinery in which contents associated with the work of the construction machinery are displayed according to an embodiment of the present invention. As illustrated, at least a partial area of the glass (e.g., front glass) 810 of the construction equipment (e.g., excavator) may be included in a transparent display panel (e.g., a transparent OLED panel, etc.), or replaced with the transparent display panel. When using the transparent display panel like this, a user (e.g., the construction equipment worker, etc.) may check various information displayed on the display panel and at the same time, identify or recognize the environment beyond the display panel.

According to an embodiment, various contents may be output or displayed on the transparent display panel. Here, the content may include any text, image, video, etc., output on the transparent display panel, and for example, the content may include an Augmented Reality (AR) content and/or a Mixed Reality (MR) content. In the illustrated example, the content may include an icon image 820_1 representing the fuel amount of the construction equipment, and a text image 820_2 representing the speed and RPM of the construction equipment. The icon image, the text image, etc., may be displayed at a specific position in the image regardless of the image.

According to an embodiment, in order to generate the content (e.g., MR content) displayed on the transparent display panel, at least one image sensor installed to capture a surrounding (e.g., front part) of the construction equipment may be used. For example, various objects included in the work space of the construction equipment may be extracted or identified based on the video and/or the image obtained by capturing the surrounding acquired from the image sensor. Then, a content associated with the extracted or identified object may be generated and displayed on the transparent display panel. By such a configuration, the worker of the construction equipment may check various contents displayed on the glass 810 without using a separate display panel to check information associated with work, and perform the work efficiently without distracting a gaze.

Figure 9:
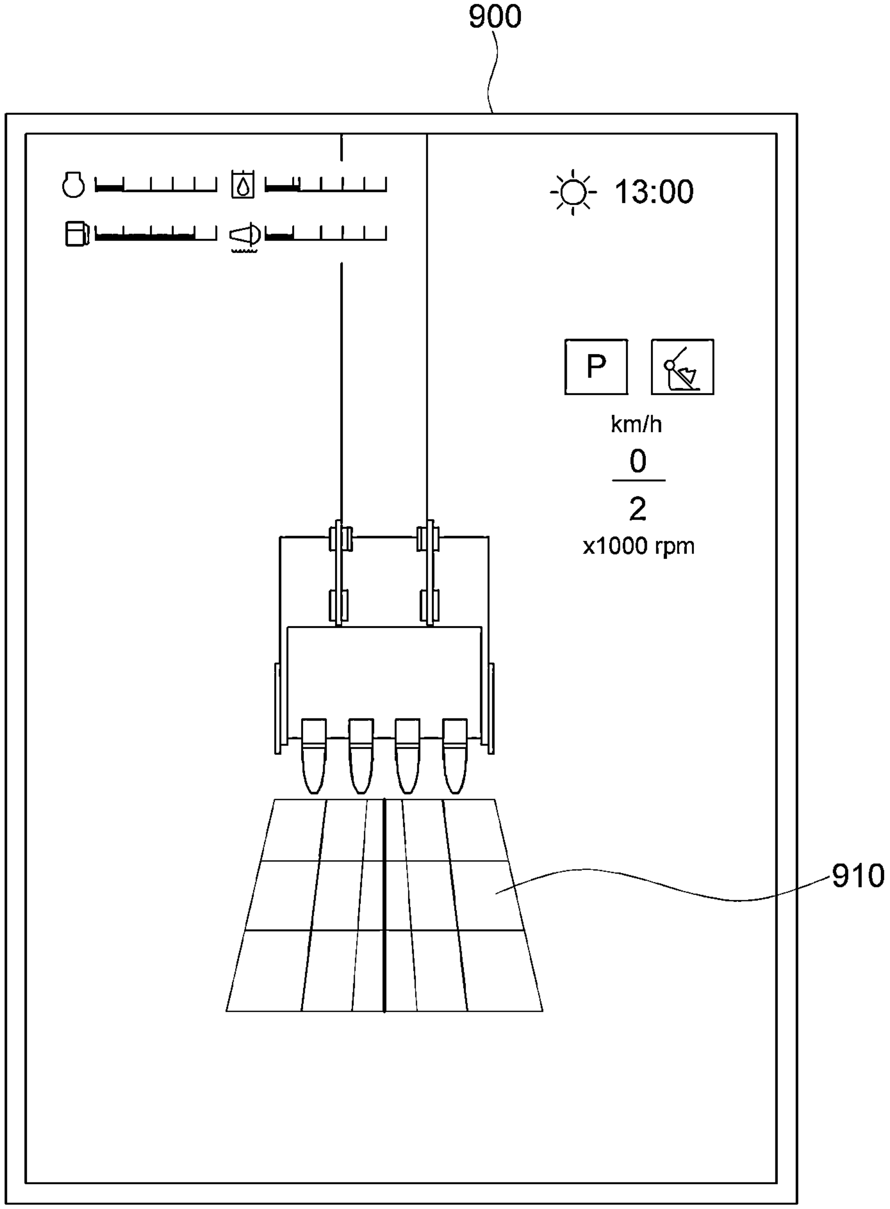
FIG. 9 is a diagram illustrating an example in which an auxiliary image corresponding to drawing information is displayed according to an embodiment of the present invention.

FIG. 9 is a diagram illustrating an example in which an auxiliary image 910 corresponding to drawing information is displayed according to an embodiment of the present invention. The illustrated example may represent an example in which the entire glass 900 of the construction equipment is replaced with the transparent display panel or the transparent display panel mounted on an upper end is moved to the side of the glass 900 and activated. As described above, the computing device (310 in FIG. 3) may receive a surrounding image including the work space of the construction equipment from at least one image sensor and activate the transparent display panel on the glass of the construction equipment. Further, the computing device may display a content associated with the work of the construction equipment using the image including the work space on the activated transparent display panel.

According to an embodiment, the computing device receives drawing information associated with the work of the construction equipment, and matches an auxiliary image 910 corresponding to the drawing information on the work space (a position and/or an area corresponding to the work space) by using the drawing information and the image representing the work space to create the content. In the illustrated example, the auxiliary image 910 may be displayed on an actual work area on the ground and may include any guide line, etc. In other words, the worker may check a virtual content that is adaptively displayed to the real environment through the real environment and the transparent display panel, and perform work such as digging.

According to an embodiment, the area and/or position on the transparent display panel where the auxiliary image 910 is displayed may be determined differently depending on the user information including the gaze height, the head position, the gaze direction, etc., of the user. For example, as the user's gaze height increases, the auxiliary image 910 may be displayed at the lower end of the transparent display panel. In this case, the shape and/or form of the auxiliary image 910 may also be changed differently depending on the user information. That is, the auxiliary image 910 may be changed based on the image depending on the user's gaze direction, etc.

Figure 10:
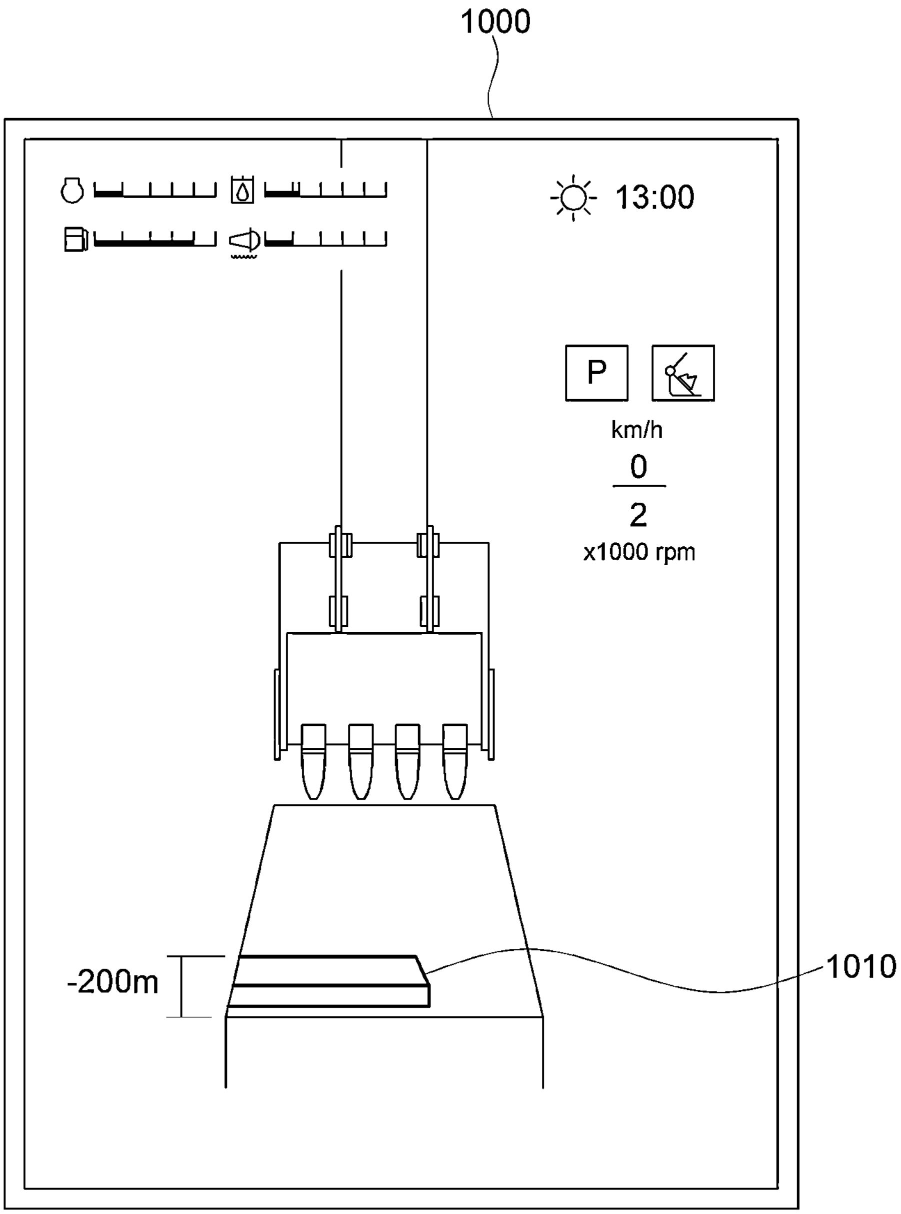
FIG. 10 is a diagram illustrating an example in which an auxiliary image corresponding to information on an object is displayed according to an embodiment of the present invention.

FIG. 10 is a diagram illustrating an example in which an auxiliary image 1010 corresponding on information on an object is displayed according to an embodiment of the present invention. The illustrated example may represent an example in which the entire glass 1000 of the construction equipment is replaced with the transparent display panel or the transparent display panel mounted on an upper end is moved to the side of the glass 1000 and activated. As described above, the computing device (310 in FIG. 3) may receive a surrounding image including the work space of the construction equipment from at least one image sensor and activate the transparent display panel on the glass of the construction equipment. Further, the computing device may display a content associated with the work of the construction equipment using the image including the work space on the activated transparent display panel.

According to an embodiment, the computing device detects the object included in the image by using a predetermined object detection algorithm, and matches an auxiliary image 1010 corresponding to the information on the detected object the work space (a position and/or an area corresponding to the work space) to create the content. In the illustrated example, the auxiliary image 1010 may be displayed on the actual work area on the ground and may include information on a position, a depth, a form, etc., of an underground buried object, etc. In other words, the worker may check a virtual content that is adaptively displayed to the real environment through the transparent display panel, and perform work of removing the underground buried object. In this case, the area and/or position on the transparent display panel where the auxiliary image 1010 is displayed may be determined differently depending on the user information including the gaze height, the head position, the gaze direction, etc., of the user.

By such a configuration, in addition to simple information such as the speed of the construction equipment, an actual image and/or virtual content helpful for work may be displayed on the glass of the construction equipment, allowing the worker to easily check and perform the work using the construction equipment.

Figure 11:
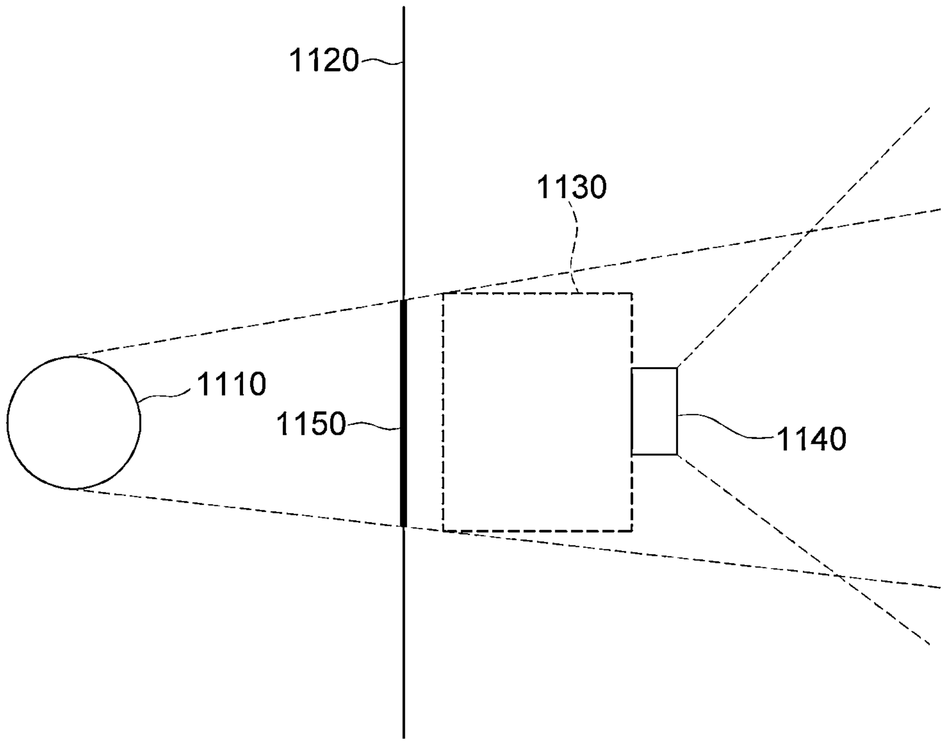
FIG. 11 is a diagram illustrating an example in which an image display area on the transparent display panel displaying the image is determined based on user information according to an embodiment of the present invention.

FIG. 11 is a diagram illustrating an example in which an image display area 1150 on the transparent display panel displaying the image is determined based on user information according to an embodiment of the present invention. The illustrated example is a diagram at a top view viewpoint of a worker 1110 on board the construction equipment gazing at a boom 1130 side through a cabin window (glass) 1120. As illustrated, the visibility of the worker 1110 may be blocked by the boom 1130 formed on one side of the cabin. In order to secure the visibility of the worker 1110, an image captured by the image sensor 1140 installed on one side of the boom 1130 may be displayed on a transparent display panel included in the cabin window 1120.

As described above, a distance between the worker 1110 and the image sensor 1140 in the cabin, a gaze height of the worker 1110, a height at which the image sensor 1140 is installed, and a field of view of the worker 1110 and the image sensor 1140 may be different. According to an embodiment, the image captured by the image sensor 1140 may be calibrated to correspond to an actual visibility of the worker 1110. Then, the calibrated image may be displayed or output on the image display area 1150.

According to an embodiment, the image display area 1150 where the image is displayed on the transparent display panel may be determined based on user information associated with the worker 1110. As described above, there may be one or more other image sensors for capturing the worker 1110, and user information including information on the gaze height, head position, etc. of the worker 1110 may be determined and acquired based on the images and/or videos captured by the one or more other image sensors, may be present. Then, the image display area (and/or a coordinate corresponding to the area) 1150 where the image is displayed on the transparent display panel may be determined based on the determined user information.

Additionally or alternatively, there may be other image sensors within the cabin that image captured the boom 1130 side, and the image display area 1150 in which the image is displayed on the transparent display panel may be determined based on the images and/or videos captured by these image sensors and the user information. By displaying or outputting the image on the image display area 1150 determined based on the user information, the worker may check an image optimized according to his or her actual visibility.

Figure 12:
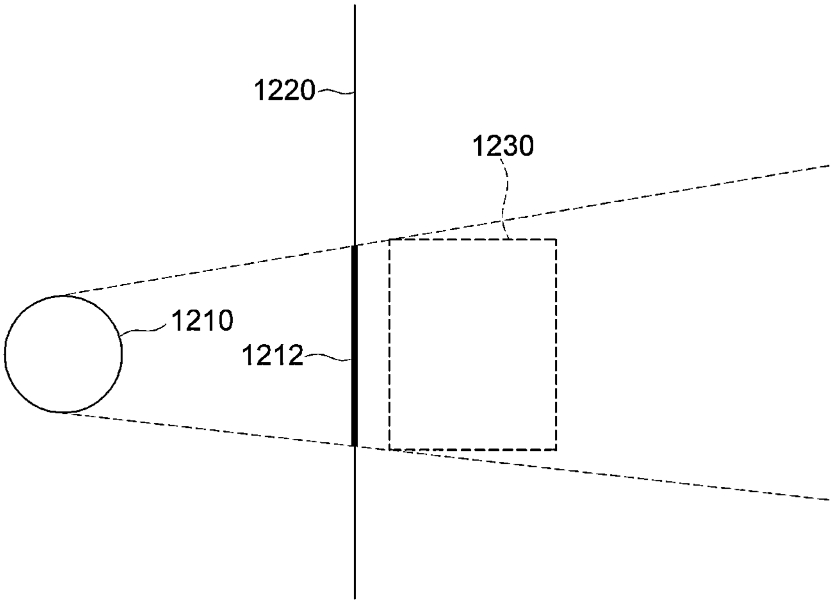
FIG. 12 is a diagram illustrating an example in which the image display area on the transparent display panel displaying the image is changed in response to the change of the user information according to an embodiment of the present invention.
Figure 12:
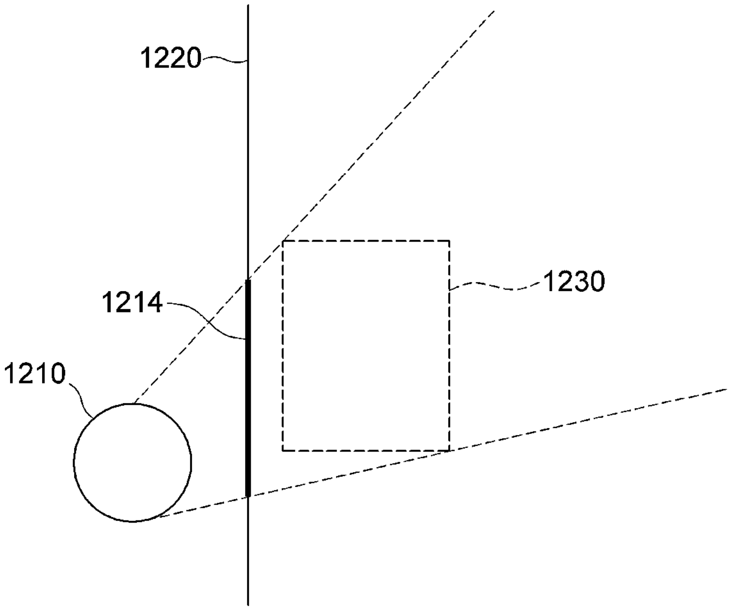

FIG. 12 is a diagram illustrating an example in which the image display area 1212 or 1214 on the transparent display panel displaying the image is changed in response to the change of the user information according to an embodiment of the present invention. As described above, a worker 1210 on board the construction equipment may gaze toward a boom 1230 through a cabin window 1220. As illustrated, the visibility of the worker 1210 may be blocked by the boom 1230 formed on one side of the cabin. In order to secure the visibility of the worker 1210, an image captured by the image sensor installed on one side of the boom 1230 may be displayed on a transparent display panel included in the cabin window 1220. In this case, the image display area 1212 where the image is displayed may be determined based on user information associated with the worker 1210.

According to an embodiment, when the worker 1210 moves, user information including a head position, a gaze height, etc., of the worker 1210 may be changed. In response to this change in user information, the image display area 1212 on the transparent display panel where the image is displayed may be changed to a different image display area 1214. That is, when the worker 1210 moves, the visibility of the worker 1210 gazing through the cabin window 1220 may be blocked by the boom 1230, and in this case, the image display area 1214 may be determined to correspond to the blocked area.

Additionally, when the user information is changed, a capturing direction and/or a capturing area of the image sensor installed on the boom 1230 may also be changed. That is, a direction and/or area captured by the image sensor may be changed in real time by a motion of the worker 1210. By such a configuration, regardless of the movement of the worker 1210 within the cabin, the worker 1210 may check an image optimized for his or her visibility in real time through the transparent display panel.

Figure 13:
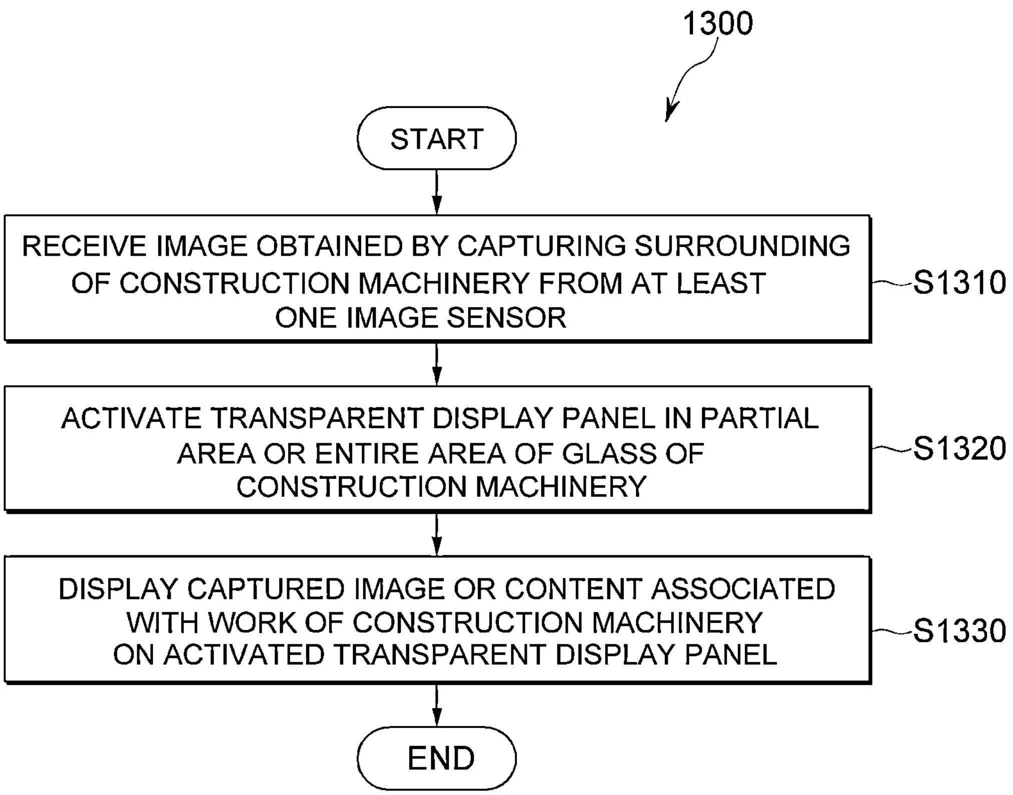
FIG. 13 is a diagram illustrating an example of a transparent display-based work assistance method for construction machinery according to an embodiment of the present invention.

FIG. 13 is a diagram illustrating an example of a transparent display-based work assistance method 1300 for construction machinery according to an embodiment of the present invention. The construction equipment work assistance method 1300 may be performed by a processor (e.g., at least one processor of the computing device). The construction equipment work assistance method 1300 may be initiated by receiving, by the processor, an image obtained by capturing the surrounding of the construction equipment from at least one image sensor (S1310). Here, the image sensor may be attached to the construction equipment or installed in the work space apart from the construction equipment.

The processor may activate a transparent display panel on a partial area or the entire area of the glass of the construction equipment (S1320). In this case, the processor may judge whether there is an obstacle blocking the visibility of the worker of the construction equipment, and activate the transparent display panel according to whether there is the obstacle. Further, the processor may display a captured image or a content associated with the work of the construction equipment on the activated transparent display panel (S1330). For example, the processor may display the received image on the partial area or the entire area of the transparent display panel based on a motion of the boom.

According to an embodiment, the processor may acquire user information including information about the visibility of the worker of the construction equipment, and convert an image corrected to correspond to the visibility of the worker according to the user information into a virtual image for displaying the corrected image on the transparent display panel. In this case, the processor can display the converted virtual image on the transparent display panel.

According to an embodiment, the processor may detect an object included in the image using a predetermined Moving Object Detection (MOD) algorithm, and display information about the detected object together with the image or without outputting the image (apart from the image) on the transparent display panel. Additionally, the processor may calculate the distance between the detected object and the construction equipment, and display information related to the calculated distance on the transparent display panel together with the image or apart from the image. Additionally, when the detected object exists within a predetermined distance from the construction equipment, the processor may display a warning icon on the transparent display panel together with the image or apart from the image.

According to an embodiment, when displaying the acquired image on the transparent display panel, the processor may display an image representing the shape of the boom of the construction equipment jointly with the image. Additionally or alternatively, the processor may display only information about objects detected beyond the boom, excluding images, on the transparent display panel to display the shape of the boom as it is based on a selection input of the worker.

According to an embodiment, the processor determines an area of the transparent display panel where the visibility of the worker of the construction equipment is blocked by the motion of the construction equipment, and display the received image on the determined area of the transparent display panel.

Figure 14:
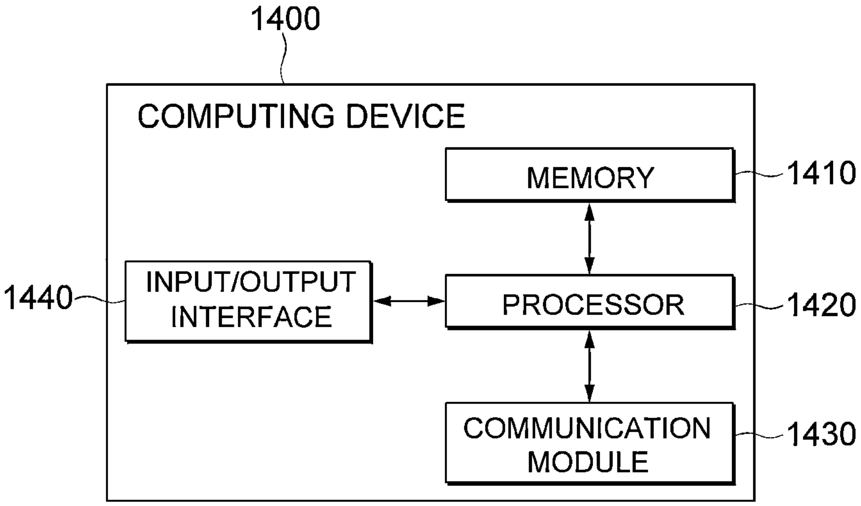
FIG. 14 is a block diagram illustrating an internal configuration of a computing device according to an embodiment of the present invention.

FIG. 14 is a block diagram illustrating an internal configuration of a computing device 1400 according to an embodiment of the present invention. The computing device 1400 may include a memory 1410, a processor 1420, a communication module 1430, and an input/output interface 1440. As illustrated in FIG. 14, the computing device 1400 may be configured to communicate information and/or data through a network by using the communication module 1430.

The memory 1410 may include any non-transitory computer-readable recording medium. According to an embodiment, the memory 1410 may include a permanent mass storage device such as a random access memory (RAM), a read only memory (ROM), a disk drive, a solid state drive (SSD), a flash memory, etc. As another example, the permanent mass storage device such as the ROM, the SSD, the flash memory, the disk drive, etc., may be included in the computing device 1400 as a separate permanent storage device distinguished from the memory. Further, an operating system and at least one program code may be stored in the memory 1410.

The software components may be loaded from a computer-readable recording medium separate from the memory 1410. The separate computer-readable recording media may include recording media directly connectable to the computing device 1400, and may include computer-readable recording media such as floppy drives, disks, tapes, DVD/CD-ROM drives, memory cards, etc., for example. As another example, the software components may be loaded into the memory 1410 through the communication module 1430 rather than the computer-readable recording medium. For example, at least one program may be loaded into the memory 1410 based on a computer program installed by files provided through the communication module 1430 by developers or a file distribution system that distributes an installation file of an application.

The processor 1420 may be configured to process instructions of a computer program by performing basic arithmetic, logic, and input/output operations. The instructions may be provided to a user terminal (not illustrated) or another external system by the memory 1410 or the communication module 1430.

The communication module 1430 may provide a configuration or function for a user terminal (not illustrated) and the computing device 1400 to communicate with each other through a network, and the computing device 1400 may provide a configuration or a function for communication with an external system (for example, a separate cloud system), etc. As an example, a control signal, an instruction, data, etc. provided under the control of the processor 1420 of the computing device 1400 may be transmitted to the user terminal and/or the external system through the communication module of the user terminal and/or the external system via the communication module 1430 and the network.

Further, the input/output interface 1440 of the computing device 1400 may be a means for interfacing with a device (not illustrated) for an input or an output, which may be connected to the computing device 1400 or included in the computing device 1400. In FIG. 14, the input/output interface 1440 is illustrated as an element configured separately from the processor 1420, but the present invention is not limited thereto, and the input/output interface 1440 may be configured to be included in the processor 1420. The computing device 1400 may include more components than those of FIG. 14. However, there is no need to clearly illustrate most components in the related art.

The processor 1420 of the computing device 1400 may be configured to manage, process, and/or store information and/or data received from a plurality of user terminals and/or a plurality of external systems.

The method and/or various embodiments may be implemented by a digital electronic circuit, computer hardware, firmware, software, and/or a combination thereof. Various embodiments of the present invention may be executed by a data processing device, e.g., one or more programmable processors and/or one or more computing devices, or implemented by a computer-readable recording medium and/or a computer program stored in the computer-readable recording medium. The computer program described above may be written in any form of programming language, including compiled language or interpreted language, and may be distributed in any form of independent executable program, module, and subroutine. The computer program may be distributed through one computing device, a plurality of computing devices that are connected through the same network, and/or a plurality of computing devices distributed to be connected through a plurality of different networks.

The method and/or various embodiments may be performed by one or more processors configured to operate based on the input data or execute one or more computer programs processing, storing, and/or managing a predetermined function, a predetermined function, etc., by generating the output data. For example, the method and/or various embodiments of the present invention may be performed by a special-purpose logic circuit such as a field programmable gate array (FPGA) or application specific integrated circuit (ASIC), and a device and/or a system for performing the method and/or embodiments of the present invention may be implemented as the special-purpose logic circuit such as the FPGA or ASIC.

One or more processor executing the computing program may include a universal-purpose or special-purpose microprocessor and/or one or more processors of a predetermined type of digital computing device. The processor may receive an instruction and/or data from each of a read dedicated memory and a random access memory or receive the instruction and/or data from the read dedicated memory and the random access memory. In the present invention, components of the computing device performing the method and/or embodiments may include one or more processors for executing the instructions, and one or more memory devices for storing the instructions and/or data.

According to an embodiment, the computing device may send and receive data to and from one or more mass storage devices for storing data. For example the computing device may receive data from a magnetic disc or an optical disc and/or transmit data to the magnetic disc or the optical disc. A computer readable storage medium suitable for storing the commands and/or data associated with the computer program may include a predetermined type of non-volatile memory including semiconductor memory devices such as an Erasable Programmable Read-Only Memory (EPROM)), an Electrically Erasable PROM (EEPROM), a flash memory device, etc., but the present invention is not limited thereto. For example, the computer readable storage medium may include a magnetic disc such as an internal hard disc or a mobile disc, a magneto-optic disc, a CD-ROM disc, and a DVD-ROM disc.

To provide an interaction with the user, the computing device has a display device (e.g., a cathode ray tube (CRT), a liquid crystal display (LCD), etc.) for providing or displaying information to the user, and a pointing device (e.g., a keyboard, a mouse, a trackball, etc.) for the user to provide an input and/or an instruction on the computing device, but is not limited thereto. That is, the computing device may further arbitrary other types of devices for providing the interaction with the user. For example, for the interaction with the user, the computing device may provide an arbitrary type of sense feedback to the user including a visual feedback, an auditory feedback, and/or a tactile feedback. In this regard, the user may provide the input to the computing device through various gestures such as visuals, voices, and operations.

In the present invention, various embodiments may be implemented in a computing system including a backend component (e.g., a data server), a middleware component (e.g., an application server), and/or a frontend component. In this case, the components may be interconnected by a predetermined form or medium of digital data communications such as a communication network. For example, the communication network may be a (Local Area Network (LAN), a Wide Area Network (WAN), etc.

The computing device based on the embodiments described in the present specification may be implemented by using hardware and/or software configured to interact with the user, which includes a user device, a user interface (UI) device, a user terminal, or a client device. For example, the computing device may include a hand-held computing device such as a laptop computer. Additionally or alternatively, the computing device may include a Personal Digital Assistants (PDA), a tablet PC, a game console, a wearable device, an Internet of things (IoT) device, a virtual reality (VR) device, an augmented reality (AR) device, etc., but the present invention is not limited thereto. The computing device may further include another type of device configured to interact with the user. Further, the computing device may include a hand-held communication device (e.g., a mobile phone, a smart phone, a wireless cellular phone, etc.) suitable for wireless communication through a network such as a mobile communication network, etc. The computing device may be configured to wirelessly communicate with a network server by using wireless communication technologies such as a radio frequency (RF), a microwave frequency (MWF), and/or an infrared ray frequency (IRF) and/or protocols.

In the present invention, various embodiments including specific structural and functional details are exemplary. Thus, the embodiments of the present invention are not limited to the above and can be implemented in several different forms. In addition, the terms used in the present invention are intended to explain some embodiments and are not interpreted as limiting the embodiment. For example, a singular word and the above may include a plurality type as long as it is not clearly represented in context.

In the present invention, if it is not contrarily defined, all terms used in the present specification including technological or scientific terms have the same meanings as those generally understood by a person with ordinary skill in the art to which such a concept belongs. Further, generally used terms such as terms defined in a dictionary should be interpreted to have a meaning which coincides with a meaning in a context of related art.

In the present specification, the present invention is described in relation to some embodiments, but various modifications and changes can be made within the scope without departing from the scope of the present invention that can be understood by those skilled in the art in the present invention. Further, the modifications and the changes should be regarded to be included in the appended claims of this specification.

The invention claimed is:

1. A transparent display-based work assistance method for construction machinery performed by at least one processor, the method comprising:

receiving an image obtained by capturing a surrounding of the construction machinery from at least one image sensor;

activating a transparent display panel in a partial area or the entire area of a glass of the construction machinery;

displaying the captured image or a content associated with work of the construction machinery on the activated transparent display panel;

acquiring user information including information on a visibility of a worker of the construction machinery; and converting an image corrected to correspond to the visibility of the worker according to the user information into a virtual image for displaying on the transparent display panel.

2. The transparent display-based work assistance method for construction machinery of claim 1, wherein the receiving of the captured image includes receiving an image captured through at least one image sensor installed at one side of a boom of the construction machinery, and wherein the displaying of the captured image or the content associated with work of the construction machinery on the activated transparent display panel includes displaying the received image in the partial area or the entire area of the transparent display panel based on a motion of the boom.

3. The method of claim 1, further comprising:

detecting an object included in the image by using a predetermined moving object detection (MOD) algorithm; and displaying information on the detected object on the transparent display panel jointly with the image.

4. The method of claim 3, further comprising:

calculating a distance between the detected object and the construction machinery; and displaying information related to the calculated distance on the transparent display panel jointly with the image.

5. The method of claim 3, further comprising:

displaying a warning icon on the transparent display panel jointly with the image when the detected object exists within a predetermined distance from the construction machinery.

6. The method of claim 2, further comprising:

displaying an image representing a shape of a boom of the construction machinery jointly with the image when the received image is displayed on the transparent display panel.

7. The method of claim 2, further comprising:

determining an area where the visibility of the worker of the construction machinery is blocked by a motion of the construction machinery in an area of the transparent display panel, wherein the displaying of the received image in the partial area or the entire area of the transparent display panel based on the motion of the boom includes displaying the received image on the determined area of the transparent display panel.

8. The method of claim 1, further comprising:

judging whether there is an obstacle blocking the visibility of the worker of the construction machinery, wherein the activating of the transparent display panel in the partial area or the entire area of the glass of the construction machinery includes activating the transparent display panel according to whether there is the obstacle.

9. Construction machinery including a cabin where a worker is located, the construction machinery comprising:

a glass placed on at least one side of the cabin;

a transparent display panel replacing at least a partial area of the glass;

an image sensor configured to capture a surrounding image of the construction machinery; and a control unit configured to activate the transparent display panel based on work information or a worker signal of the construction machinery, wherein the transparent display panel is configured to display the captured image or a content associated with work of the construction machinery, and wherein the control unit is configured to acquire user information including information on a visibility of a worker of the construction machinery and to convert an image corrected to correspond to the visibility of the worker according to the user information into a virtual image for displaying on the transparent display panel.

10. The construction machinery of claim 9, wherein the control unit is configured to detect an object included in the image by using a predetermined MOD algorithm, and to display information on the detected object on the transparent display panel jointly with the image.

11. The construction machinery of claim 9, wherein the control unit is configured to detect an object included in the image by using a predetermined MOD algorithm, and to display a warning icon on the transparent display panel when the detected object exists within a predetermined distance from the construction machinery.

12. The construction machinery of claim 9, wherein the control unit is configured to detect an object included in the image by using a predetermined MOD algorithm, and to display the information on the detected object on the transparent display panel without outputting the image.

13. The construction machinery of claim 9, wherein the transparent display panel is placed on a side of the cabin, the construction machinery includes an excavator, and a work machine of the excavator is placed on a front part of the transparent display panel.

14. The construction machinery of claim 13, wherein the control unit is configured to activate or deactivate the transparent display panel based on a motion of swinging left or right by the work machine of the excavator.

15. The construction machinery of claim 9, wherein the transparent display panel includes a partial or entire activation area.

16. The construction machinery of claim 9, wherein the transparent display panel includes an auxiliary image configured to be changed based on the image output to the transparent display panel, and an icon image or text image configured to be changed independently of the image output to the transparent display panel.

17. The construction machinery of claim 9, wherein the image sensor is placed away from the construction machinery.

* * * * *